(12) United States Patent
Choi et al.

(10) Patent No.: US 8,951,129 B2
(45) Date of Patent: Feb. 10, 2015

(54) DEVICE FOR REGULATING STIFFNESS

(71) Applicant: Korea Institute of Science and Technology, Seoul (KR)

(72) Inventors: Jun Ho Choi, Seoul (KR); Soojun Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 13/918,646

(22) Filed: Jun. 14, 2013

(65) Prior Publication Data

US 2014/0174238 A1    Jun. 26, 2014

(30) Foreign Application Priority Data

Dec. 21, 2012 (KR) .......................... 10-2012-0150471

(51) Int. Cl.
*F16D 7/04* (2006.01)
*F16D 3/16* (2006.01)
*F16D 3/00* (2006.01)

(52) U.S. Cl.
CPC *F16D 3/16* (2013.01); *F16D 3/005* (2013.01); *Y10S 901/28* (2013.01)
USPC ................. 464/39; 464/81; 901/28

(58) Field of Classification Search
USPC ............ 464/37–39, 81, 84, 86, 100, 101, 40; 74/490.05; 901/28
See application file for complete search history.

(56) References Cited

U.S. PATENT DOCUMENTS

| | | | | | |
|---|---|---|---|---|---|
| 1,324,523 | A | * | 12/1919 | Serrell ............................. | 464/81 |
| 1,629,098 | A | * | 5/1927 | Drexler ........................ | 464/40 X |
| 3,335,835 | A | * | 8/1967 | Conlon ........................ | 464/40 X |
| 6,612,813 | B2 | * | 9/2003 | Kimura et al. ............. | 464/81 X |
| 7,965,006 | B2 | | 6/2011 | Kang et al. | |
| 2010/0326227 | A1 | | 12/2010 | Choi et al. | |

* cited by examiner

*Primary Examiner* — Gregory Binda
(74) *Attorney, Agent, or Firm* — NSIP Law

(57) ABSTRACT

A device for regulating stiffness has a rotary shaft coupled to the driven member to rotate the driven member, a rotational connection body coupled to the rotary shaft to freely rotate thereon and rotating by a driving power of the driving motor, and an elastic connection body fixed to the rotary shaft and extending in the length direction of the rotary shaft to connect to the rotational connection body, wherein the elastic connection body gives an elastic force in a direction opposite to the rotating direction of the rotational connection body to interrupt free rotation of the rotational connection body with respect to the rotary shaft, and wherein if the rotational connection body rotates by the driving motor, the elastic force of the elastic connection body acts as spring so that the rotating force of the rotational connection body is transmitted to the rotary shaft.

11 Claims, 18 Drawing Sheets

DEVICE FOR REGULATING STIFFNESS

CROSS-REFERENCE TO RELATED APPLICATION

This application claims priority to Korean Patent Application No. 10-2012-0150471, filed on Dec. 21, 2012, and all the benefits accruing therefrom under 35 U.S.C. §119, the contents of which in its entirety are herein incorporated by reference.

BACKGROUND

1. Field

The present disclosure relates to a device for regulating stiffness, and more particularly, to a device for regulating stiffness by transmitting a rotational driving power of a driving motor to a rotary shaft connected to a driven member while maintaining predetermined stiffness.

2. Description of the Related Art

A rotating structure, which includes a driven member connected to a rotary shaft and a driving motor for rotating the rotary shaft so that the driven member is rotated, is used in various fields.

For example, the rotating structure may be easily found at a robot manipulator or the like and also used for treatment such as joint rehabilitation when a joint is damaged by an accident or the like.

FIG. 1 is a schematic view showing an example of a conventional rotating structure.

As shown in FIG. 1, if a joint portion 4 of the leg 1 of a patient is damaged and needs to be rehabilitated, a support member 5 is fixed to the thigh 2, and a driven member 6 hinged by the support member 5 is fixed to the calf 3. At this time, a hinge connection portion 7 between the support member 5 and the driven member 6 is fixed to the corresponding location of the joint portion 4.

A rotary shaft (not shown) is formed at one end of the support member 5 located at the hinge connection portion 7, and a driving motor 8 is connected to the rotary shaft.

If the rotary shaft rotates by the driving motor 8, the driven member 6 rotates on the hinge connection portion 7 with respect to the support member 5 by means of the rotating force of the rotary shaft. If the driven member 6 is rotated, the calf 3 fixed to the driven member 6 also rotates on the joint portion 4 accordingly.

If the driven member 6 is repeatedly rotated in clockwise and counterclockwise directions by adjusting a driving direction of the motor 8, the motion of bending and spreading the leg 1 may be performed repeatedly, and this motion helps rehabilitation of the damaged joint portion 4.

However, as shown in FIG. 1, if the rotating force of the driving motor 8 is directly transmitted to the rotary shaft which rotates the driven member 6, the rotating movement of the driven member 6 is entirely restricted by the driving power of the driving motor 8, which is called a rigidly coupling state. In other words, if the driving motor 8 starts driving, the driven member 6 also instantly rotates, and unless the driving motor 8 stops driving, a rotating force is continuously applied to the driven member 6.

The joint portion 4 of a person is an organ which operates by soft muscle contraction. If the joint portion 4 of a person moves by using a rotating structure in a rigidly coupling state as described above, the joint portion 4 may not follow the movement of the driven member 6, which may run the risk and damage the joint portion 4.

In addition, the damaged joint portion 4 may be hardened and immovable in a moment. At this time, unless the driving power of the driving motor 8 is intercepted instantly, the rotating force of the driving motor 8 may move the joint portion 4 constrainedly and give a great damage to the joint portion 4. The above phenomenon may also occur when the calf 3 cannot rotate any more due to an obstacle or the like.

Meanwhile, even when the above rotating structure is used for a robot manipulator (when the support member and the driven member are respectively robot arms), if the safety of the robot is considered, the stiffness of the rotary shaft and the driving motor for rotating a driven member needs to be suitably adjusted, as well known in the art.

As described above, when transmitting power of the driving motor and the rotary shaft, their stiffness should be suitably adjusted. For this, a stiffness generating device capable of generating desired stiffness may be used for adjusting the stiffness.

However, a conventional stiffness generating device changes stiffness by using an electromagnetic configuration as disclosed in Patent Literature 1, which however has a complicated design and is not easily controlled.

SUMMARY

The present disclosure is directed to providing a device for regulating stiffness, which may adjust stiffness in a rapid and easy way with a simple structure by using a mechanical configuration.

In one aspect, there is provided a device for regulating stiffness for transmitting a driving power of a driving motor to a driven member while maintaining predetermined stiffness, the device including: a rotary shaft coupled to the driven member to rotate the driven member; a rotational connection body coupled to the rotary shaft to freely rotate thereon and rotating by a driving power of the driving motor; and an elastic connection body fixed to the rotary shaft and extending in the length direction of the rotary shaft to connect to the rotational connection body, wherein the elastic connection body gives an elastic force in a direction opposite to the rotating direction of the rotational connection body to interrupt free rotation of the rotational connection body with respect to the rotary shaft, and wherein if the rotational connection body rotates by the driving motor, the elastic force of the elastic connection body acts as spring so that the rotating force of the rotational connection body is transmitted to the rotary shaft.

The elastic connection body may include a leaf spring; and a support body fixed to the rotary shaft and fixing the leaf spring in the length direction of the rotary shaft, wherein the elastic force is generated as the leaf spring is bent in the rotating direction of the rotational connection body by using the support body as a support point.

The rotational connection body may be connected to the rotary shaft and the leaf spring to be linearly movable in the length direction of the rotary shaft, and the stiffness may be adjusted as the rotational connection body makes a linear movement so that a distance between the rotational connection body and the support body changes.

The device for regulating stiffness may further include a rotating body fixed to the rotary shaft to free rotate thereon, wherein the rotating body may be connected to the rotational connection body by a link, and as the rotating body rotates, the rotational connection body linearly may move in the length direction of the rotary shaft.

The link may have one end joint-connected to the rotating body and the other end joint-connected to the rotational connection body and may be formed by a link arm disposed with a slant with respect to the rotary shaft.

The link arm may have one end connected to a universal joint connected to the rotating body and the other end connected to the rotational connection body by a ball joint.

A plurality of link arms may be disposed radially based on the rotary shaft.

The rotating body may include a first rotating body and a second rotating body disposed with the rotational connection body being interposed therebetween; the driving motor may include a first driving motor and a second driving motor respectively connected to the first rotating body and the second rotating body to rotate the first rotating body and the second rotating body independently; the first rotating body and the second rotating body may be respectively connected to the rotational connection body by the link; when the first driving motor and the second driving motor respectively rotate the first rotating body and the second rotating body in opposite directions based on the rotary shaft, the rotational connection body may not rotate with respect to the rotary shaft but linearly move in the length direction of the rotary shaft; and when the first driving motor and the second driving motor respectively rotate the first rotating body and the second rotating body in the same direction based on the rotary shaft, the rotational connection body may not linearly move in the length direction of the rotary shaft but rotate with respect to the rotary shaft.

The support body may be coupled to the rotary shaft to freely rotate thereon, and the support body may be selectively fixed to or separated from the rotary shaft by means of a fixing member so as to rotate integrally with the rotary shaft or freely rotate separately from the rotating body.

The fixing member may include: a second cam member linearly movable on the rotary shaft and having a coupling protrusion formed thereon; a first cam member coupled to the support body and having a coupling groove formed therein so as to be coupled with the coupling protrusion; and a spring connected to the male cam member to press the male cam member toward the first cam member.

The first cam member may be coupled to the support body in a direction opposite to the direction in which the leaf spring is fixed.

The support body may include a plurality of support units extending in a radial direction with respect to the rotary shaft, and a leaf spring may be fixed to each of the plurality of support units.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
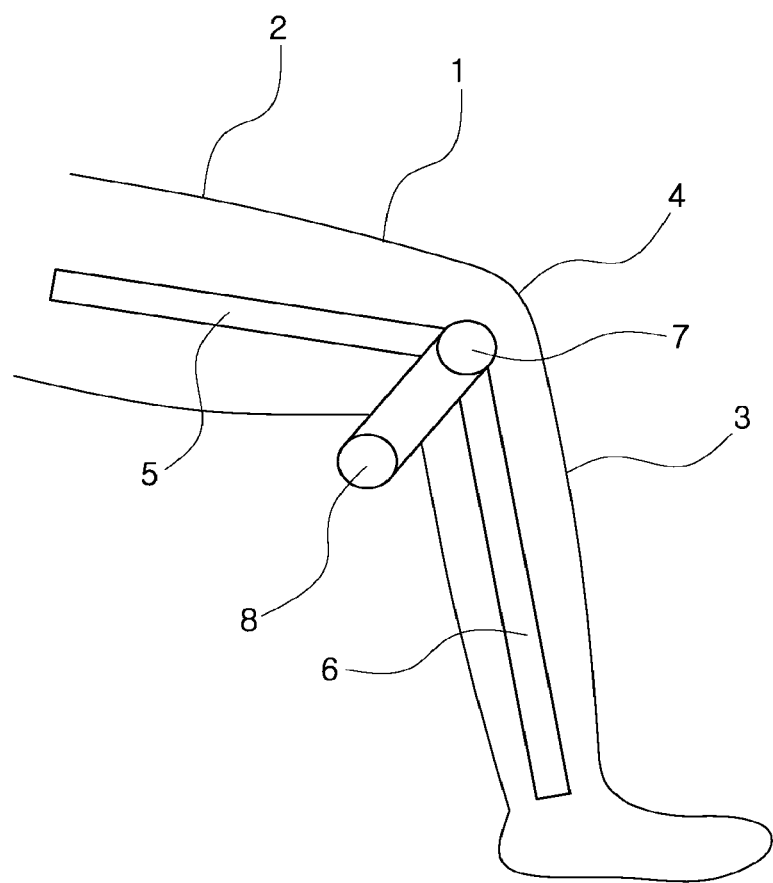
FIG. 1 is a schematic view showing an example of a conventional rotating structure.

Hereinafter, an embodiment of the present disclosure capable of implementing the above object will be described with reference to the accompanying drawings. Though the present disclosure is described with reference to the embodiments depicted in the drawings, the embodiments are just examples, and the spirit of the present disclosure and its essential configurations and operations are not limited thereto.

Figure 2:
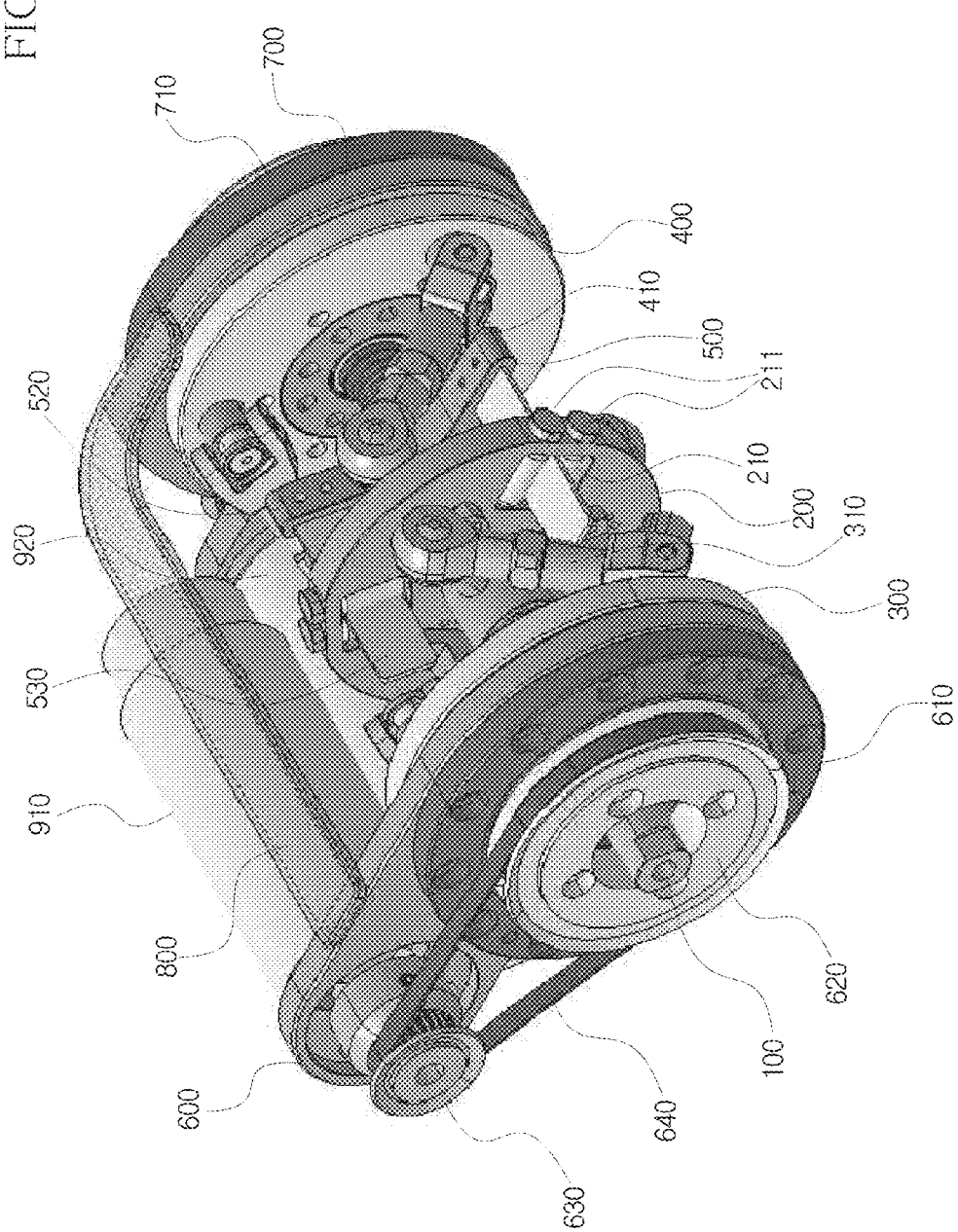
FIG. 2 is a perspective view showing a device for regulating stiffness according to an embodiment of the present disclosure.
Figure 3:
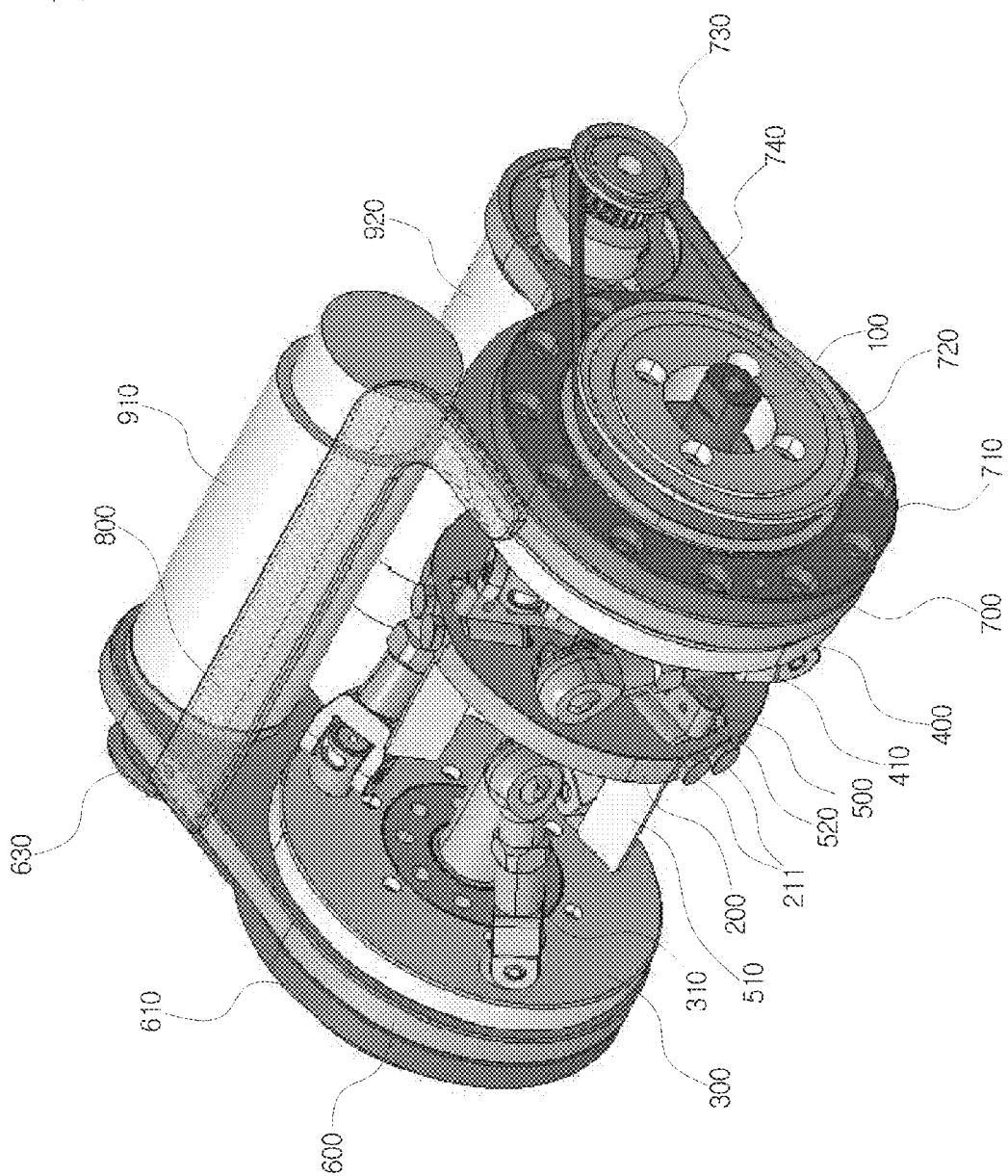
FIG. 3 is a perspective view showing the device for regulating stiffness of FIG. 2, observed at a different angle.
Figure 4:
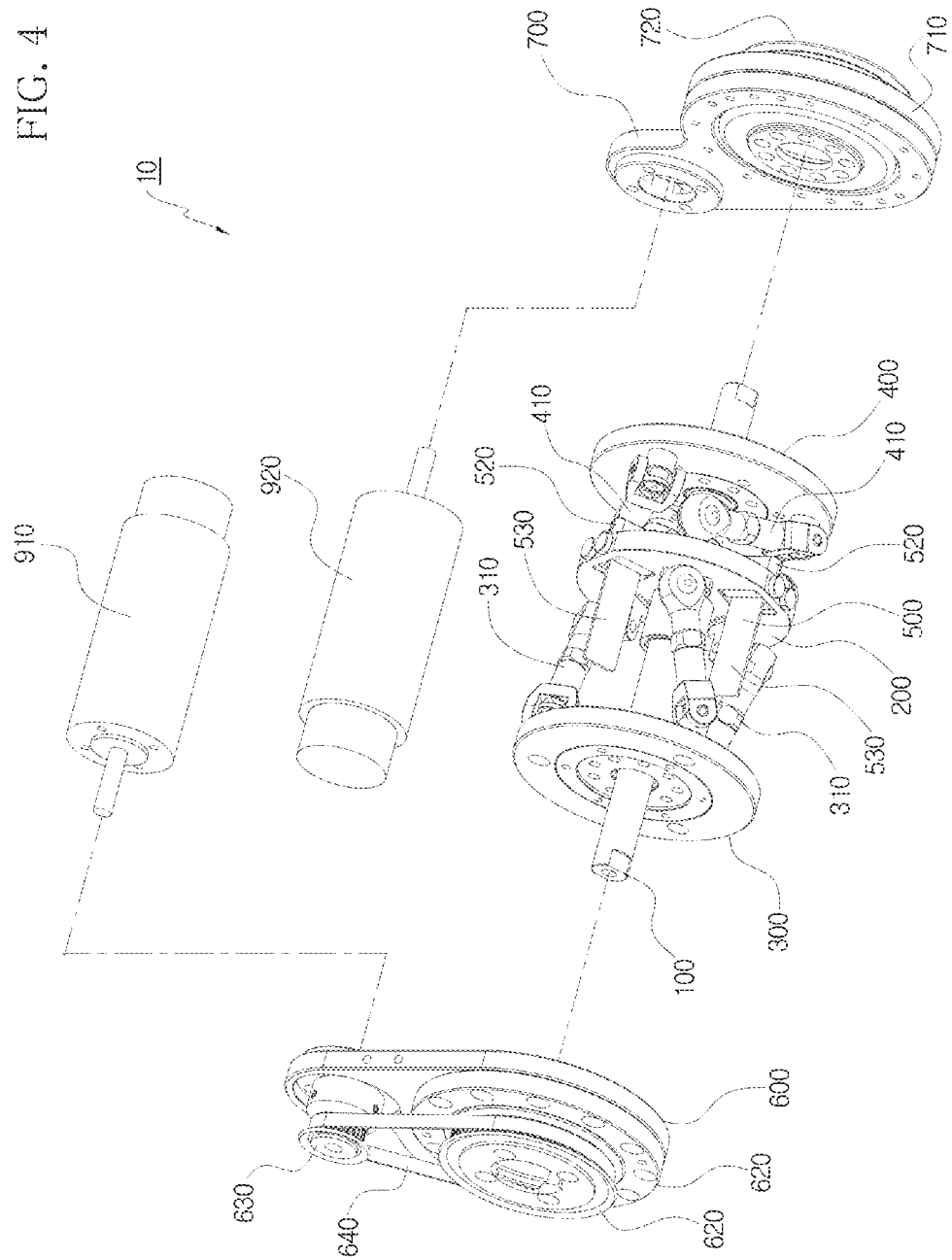
FIG. 4 is an exploded perspective view showing the device for regulating stiffness of FIG. 2.

FIG. 2 is a perspective view showing a device 10 for regulating stiffness (hereinafter, also referred to as a stiffness regulating device 10) according to an embodiment of the present disclosure, FIG. 3 is a perspective view showing the stiff regulating device 10 of FIG. 2, observed at a different angle, and FIG. 4 is an exploded perspective view showing the stiff regulating device 10 of FIG. 2. In FIG. 4, a third frame 800 is not depicted.

As shown in FIGS. 2 to 4, the stiffness regulating device 10 includes a rotary shaft 100, a rotational connection body 200 formed on the rotary shaft 100, a first rotating body 300 and a second rotating body 400 formed on the rotary shaft 100 with the rotational connection body 200 being interposed between them, an elastic connection body 500 located between the first rotating body 300 and the second rotating body 400 and coupled to the rotational connection body 200, a first frame 600 and a second frame 700 formed with the first rotating body 300 and the second rotating body 400 being interposed between them, a third frame 800 for fixing the first frame 600 and the second frame 700 to each other, and a first driving motor 910 and a second driving motor 920 respectively connected to the first frame 600 and the second frame 700.

The rotary shaft 100 extends in a direction perpendicular to the first frame 600 and the second frame 700. The rotary shaft 100 extends to have a length so that both ends thereof are exposed out of the first frame 600 and the second frame 700. The rotary shaft 100 is not directly fixed by the first frame 600 and the second frame 700, and the rotation of the rotary shaft 100 is not restricted by the first frame 600 and the second frame 700.

One end or both ends of the rotary shaft 100 exposed out of the first frame 600 and the second frame 700 are coupled to a driven member (not shown) to be rotated by a driving motor. If the rotary shaft 100 rotates, the driven member rotates together.

The driven member of this embodiment is not limited to an elongated rod-shaped driven member as shown in FIG. 1, and it should be understood that any member rotatable by the rotary shaft 100 may be used as the driven member of this embodiment.

A support member is coupled to any one of the first to third frames to fix the stiff regulating device 10.

Similar to the above, the support member is not limited to an elongated rod-shaped support member as shown in FIG. 1, and it should be understood that any member for fixing the stiff regulating device 10 at a specific location can be used as the support member.

A fixing drum 610 is coupled to the first frame 600, and the fixing drum 610 rotatably fixes a first pulley 620. The first pulley 620 is connected to a second pulley 630, rotatably fixed to the first frame 600, by a belt 640, and the second pulley 630 is connected to the first driving motor 910 and rotates by the first driving motor 910.

The first rotating body 300 is fixed to the first pulley 620 with the first frame 600 being interposed between them. The rotation of the first rotating body 300 is not restricted by the first frame 600, and if the first pulley 620 rotates, the first rotating body 300 rotates together.

According to the above configuration, the first driving motor 910 rotates to make the second pulley 630 rotate, the rotation of the second pulley 630 makes the first pulley 610 rotate, and the rotation of the first pulley 610 makes the first rotating body 300 rotate.

A fixing drum 710 is coupled to the second frame 700, and the fixing drum 710 rotatably fixes a first pulley 720. The first pulley 720 is connected to a second pulley 730, rotatably fixed to the second frame 700, by a belt 740, and the second pulley 730 is connected to the second driving motor 920 and rotates by the second driving motor 920.

The second rotating body 400 is fixed to the first pulley 720 with the second frame 700 being interposed between them. The rotation of the second rotating body 400 is not restricted by the second frame 700, and if the first pulley 720 rotates, the second rotating body 400 rotates together.

According to the above configuration, the second driving motor 920 rotates to make the second pulley 730 rotate, the rotation of the second pulley 730 makes the first pulley 710 rotate, and the rotation of the first pulley 710 makes the second rotating body 400 rotate.

The first rotating body 300 and the second rotating body 400 are connected to the rotary shaft 100 to freely rotate thereon, and are linked to the rotational connection body 200 respectively by means of a link arm 310 and a link arm 410.

An elastic connection body 500, which includes a leaf spring 530 extending in the length direction of the rotary shaft 100 and a support body 520 selectively fixed to or rotatably coupled to the rotary shaft 100 to support one end of the leaf spring 530, is coupled to the rotary shaft 100. The elastic connection body 500 is fixed to the rotary shaft 100 at ordinary time to rotate together with the rotary shaft 100.

The rotational connection body 200 is connected to the rotary shaft 100 to freely rotate thereon and is formed on the rotary shaft 100 to be linearly movable in the length direction of the rotary shaft 100.

A slit 210 is formed in the rotational connection body 200 to vertically perforate the rotational connection body 200, and two rollers 211 facing each other are provided in the slit 210.

The rotational connection body 200 and the elastic connection body 500 are coupled so that the leaf spring 530 is inserted between two rollers 211.

The rotational connection body 200 is connected to the rotary shaft 100 to freely rotate thereon. However, since the leaf spring 530 of the elastic connection body 500 selectively fixed to or rotatable on the rotary shaft 100 is coupled through the rotational connection body 200 in the vertical direction, the free rotation of the rotational connection body 200 with respect to the rotary shaft 100 is restricted by an allowable bending angle of the leaf spring 530. Meanwhile, the movement in the length direction on the rotary shaft 100 is not restricted by the leaf spring 530.

Figure 5:
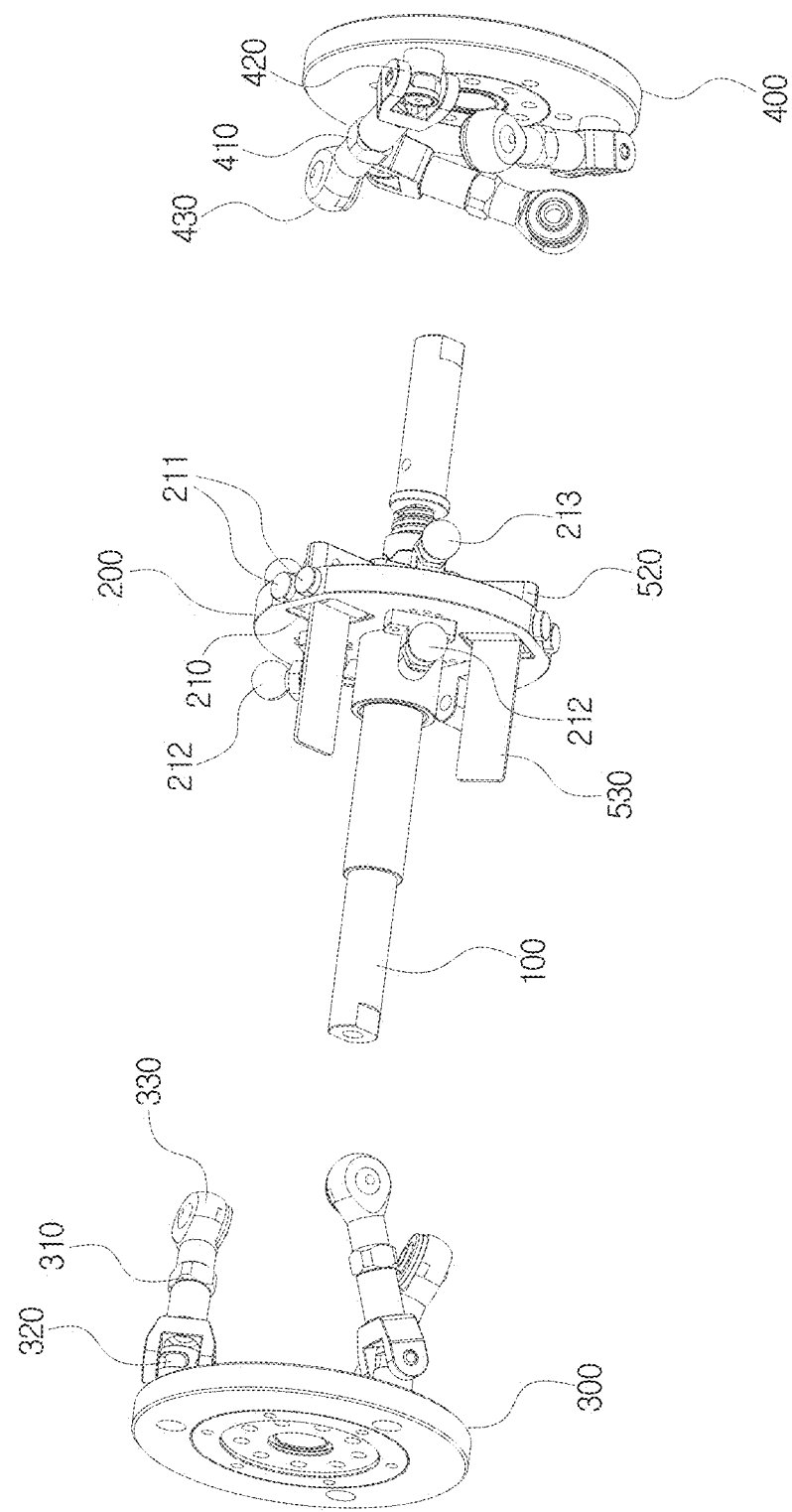
FIG. 5 is an exploded perspective view showing a rotary shaft, employed in the device for regulating stiffness of FIG. 2, as well as an elastic connection body, a rotational connection body and a rotating body connected thereto.

FIG. 5 is an exploded perspective view showing the rotary shaft 100 of the stiff regulating device 10 of this embodiment as well as the elastic connection body 500, the rotational connection body 200 and the rotating bodies 300, 400 connected thereto.

As shown in FIG. 5, a plurality of link arms 310 are coupled to the first rotating body 300 in the radial direction with respect to the center of the first rotating body 300. One end 320 of the link arms 310 is connected to the first rotating body 300 by a universal joint, and the other end 330 is coupled to a ball 212 formed on the upper surface of the rotational connection body 200 and connected to the rotational connection body 200 by a ball joint.

Since the link arm 310 is coupled with a slant with respect to the center of the first rotating body 300, the link arm 310 is formed with a slant with respect to the rotary shaft 100 which passes through the center of the first rotating body 300. The plurality of link arms 310 are formed to have the same direction and angle and disposed to be wound around the rotary shaft 100.

A plurality of link arms 410 are also provided to the second rotating body 400 in the radial direction with respect to the center of the second rotating body 400. One end 420 of the link arm 410 is connected to the second rotating body 400 by a universal joint, and the other end 430 is coupled to a ball 213 formed on the lower surface of the rotational connection body 200 and connected to the rotational connection body 200 by a ball joint.

Since the link arm 410 is also coupled with a slant with respect to the center of the second rotating body 400, the link arm 410 is formed with a slant with respect to the rotary shaft 100 which passes through the center of the second rotating body 400. The plurality of link arms 410 are formed with the same direction and angle and disposed to be wound around the rotary shaft 100.

Figure 6:
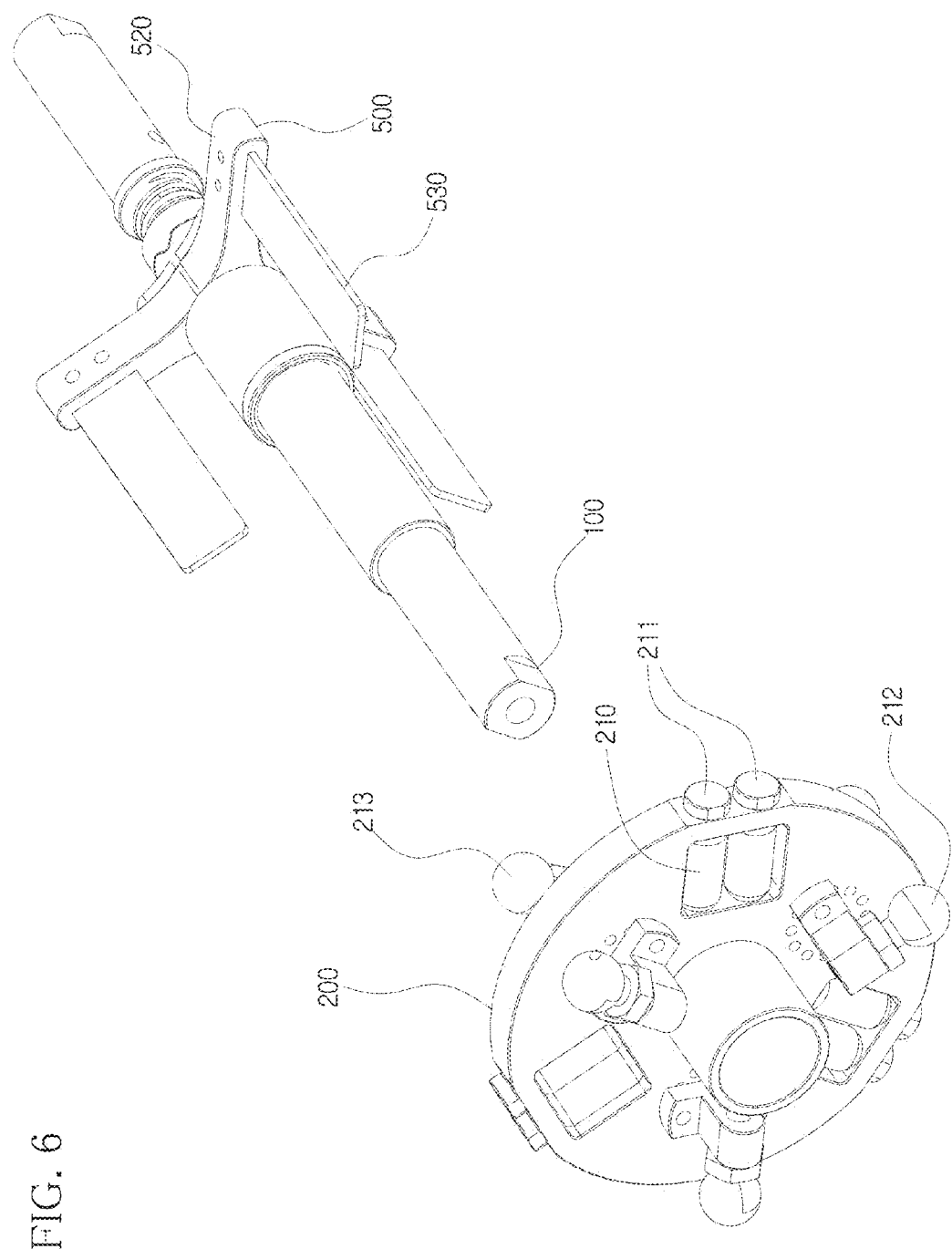
FIG. 6 is an exploded perspective view showing a rotary shaft, employed in the device for regulating stiffness of FIG. 2, as well as an elastic connection body and a rotational connection body connected thereto.

FIG. 6 is an exploded perspective view showing the rotary shaft 100 of the stiff regulating device 10 of this embodiment as well as the elastic connection body 500 and the rotational connection body 200 connected thereto.

As shown in FIG. 6, three slits 210 are formed in the rotational connection body 200 between two adjacent balls 212.

The support body 520 of the elastic connection body 500 is made of rigid material which does not bend and includes three support units extending in the radial direction with respect to the rotary shaft 100. Three leaf springs 530 are respectively fixed to the three support units. One end of the leaf spring 530 not fixed by the support body 520 will be a free end. As described later, if the rotational connection body 200 rotates, the leaf spring 530 having one free end is bent with the support body 520 serving as a support point and gives an elastic force to the rotational connection body 200.

Figure 7:
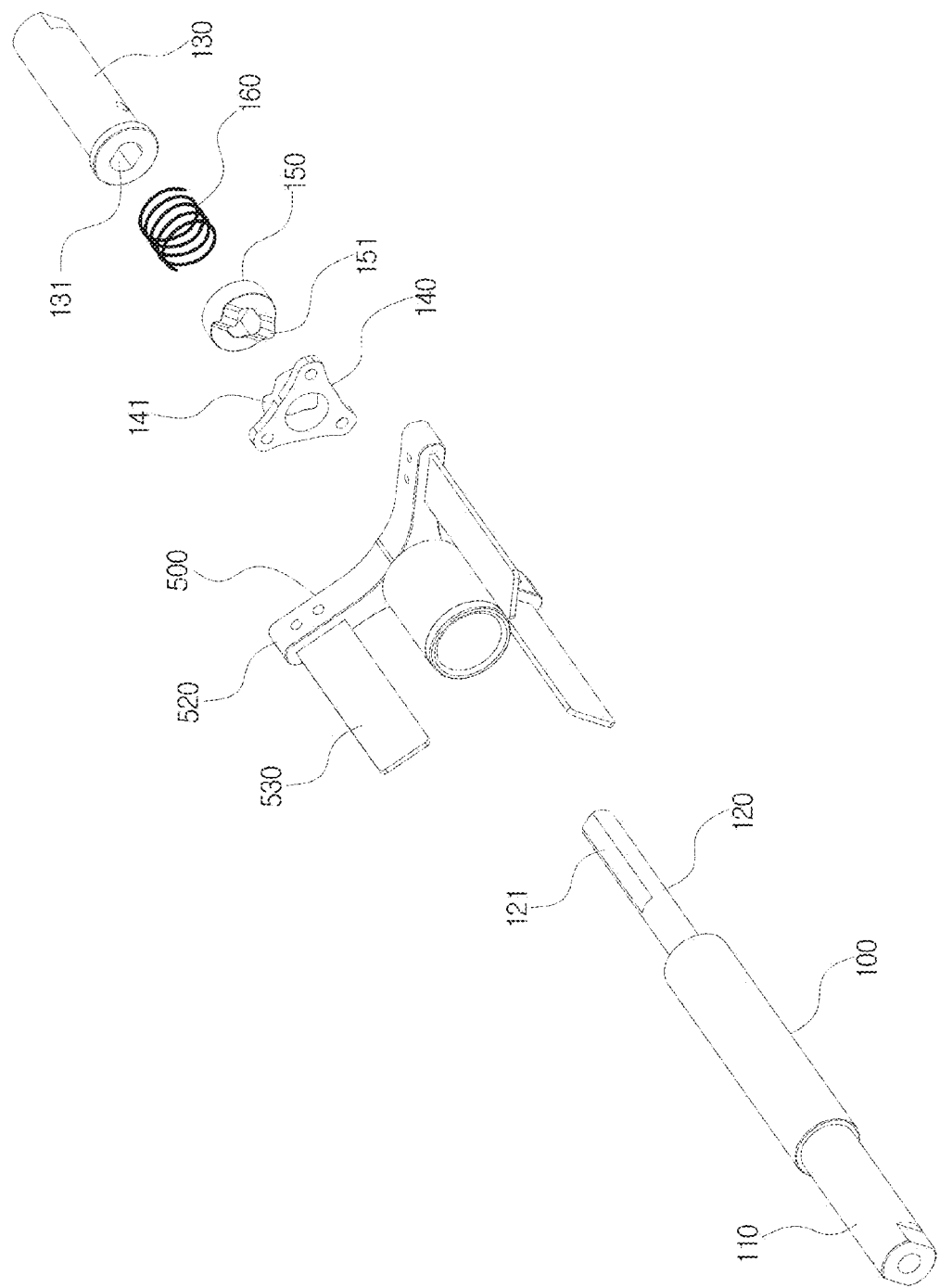
FIG. 7 is an exploded perspective view showing a rotary shaft and an elastic connection body, employed in the device for regulating stiffness of FIG. 2.

FIG. 7 is an exploded perspective view showing the rotary shaft 100 and the elastic connection body 500 of the stiff regulating device 10 of this embodiment.

As shown in FIG. 7, the rotary shaft 100 includes a first large-diameter portion 110 coupled to the first rotating body 300, a small-diameter portion 120 extending from the rear end of the first large-diameter portion 110, and a second large-diameter portion 130 connected to the small-diameter portion 120 and coupled with the second rotating body 400.

A straight chamfering 121 is formed at the rear end of the cylindrical small-diameter portion 120. Accordingly, the rear end of the small-diameter portion 120 has an approximately hexagonal sectional shape. A hole having a hexagonal sectional shape is formed at the front end of the second large-diameter portion 130 so that the rear end of the small-diameter portion 120 may be inserted therein. Since the rear end of the small-diameter portion 120 is inserted into the hole of the second large-diameter portion 130 with a hexagonal sectional shape, the first large-diameter portion 110 and the second large-diameter portion 130 rotate integrally.

A support body 520 of the elastic connection body 500 is coupled to the small-diameter portion 120 so as to closely adhere to the joint between the first large-diameter portion 110 and the small-diameter portion 120. The support body 520 may freely rotate on the small-diameter portion 120.

However, the free rotation of the support body 520 is restricted by the fixing member. The fixing member of this embodiment includes a first cam member 140 fixed to the support body 520 in a direction opposite to the extending direction of the leaf spring 530, a second cam member 150 having a coupling protrusion 151 which may be coupled to a coupling groove 141 formed in the first cam member 140, and a spring 160 disposed between the second cam member 150 and the front end of the second large-diameter portion 130.

The rotary shaft 100 and the elastic connection body 500 are coupled to each other by inserting the support body 520 of the elastic connection body 500 into the small-diameter portion 120, subsequently inserting the first cam member 140 into the small-diameter portion 120 to be coupled to the support body 520, then inserting the second cam member 150 and the spring 160 into the small-diameter portion 120, and then finally inserting the second large-diameter portion 130 into the rear end of the small-diameter portion 120.

According to the above configuration, the elastic connection body 500 may be selectively fixed to or separated from the rotary shaft 100 by means of the fixing member, so that the elastic connection body 500 may rotate integrally with the rotary shaft 100 or freely rotate separately from the rotating body 100. This will be described in detail later.

Hereinafter operations of the stiff regulating device 10 of this embodiment will be described with reference to FIGS. 8 to 12.

Figure 8:
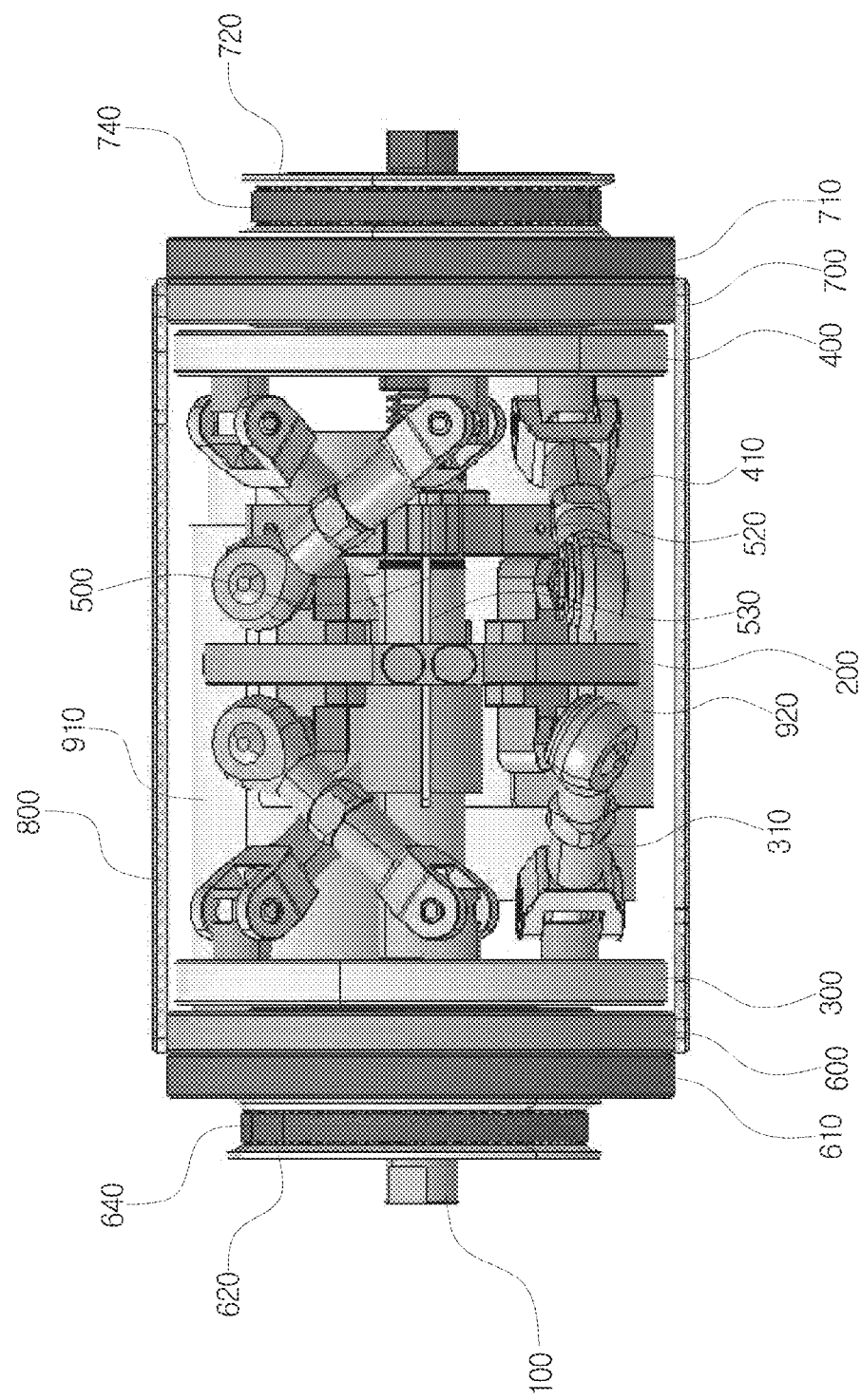
FIGS. 8 to 10 are diagrams for illustrating a stiffness adjusting operation by using the device for regulating stiffness of FIG. 2.
Figure 9:
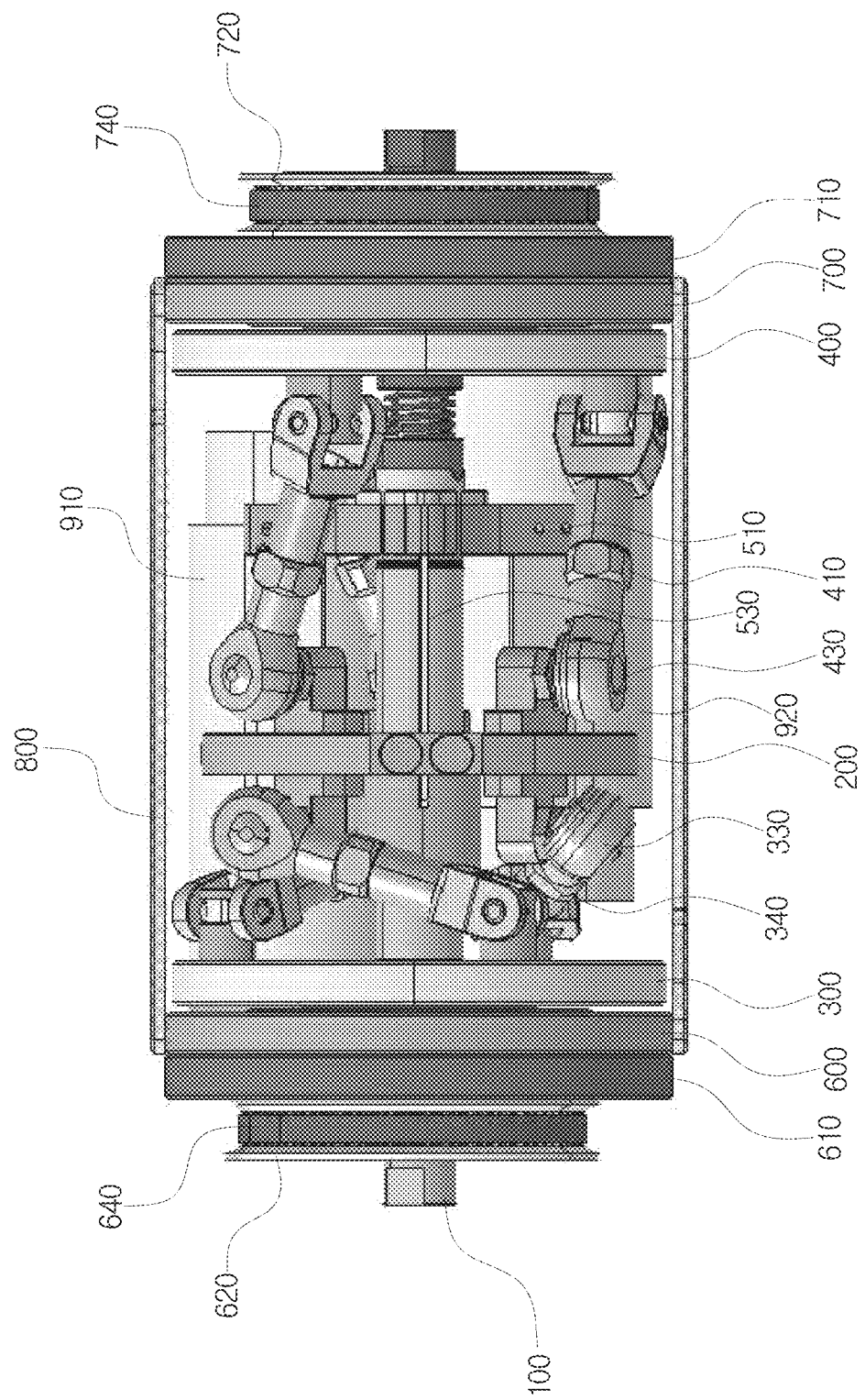
Figure 10:
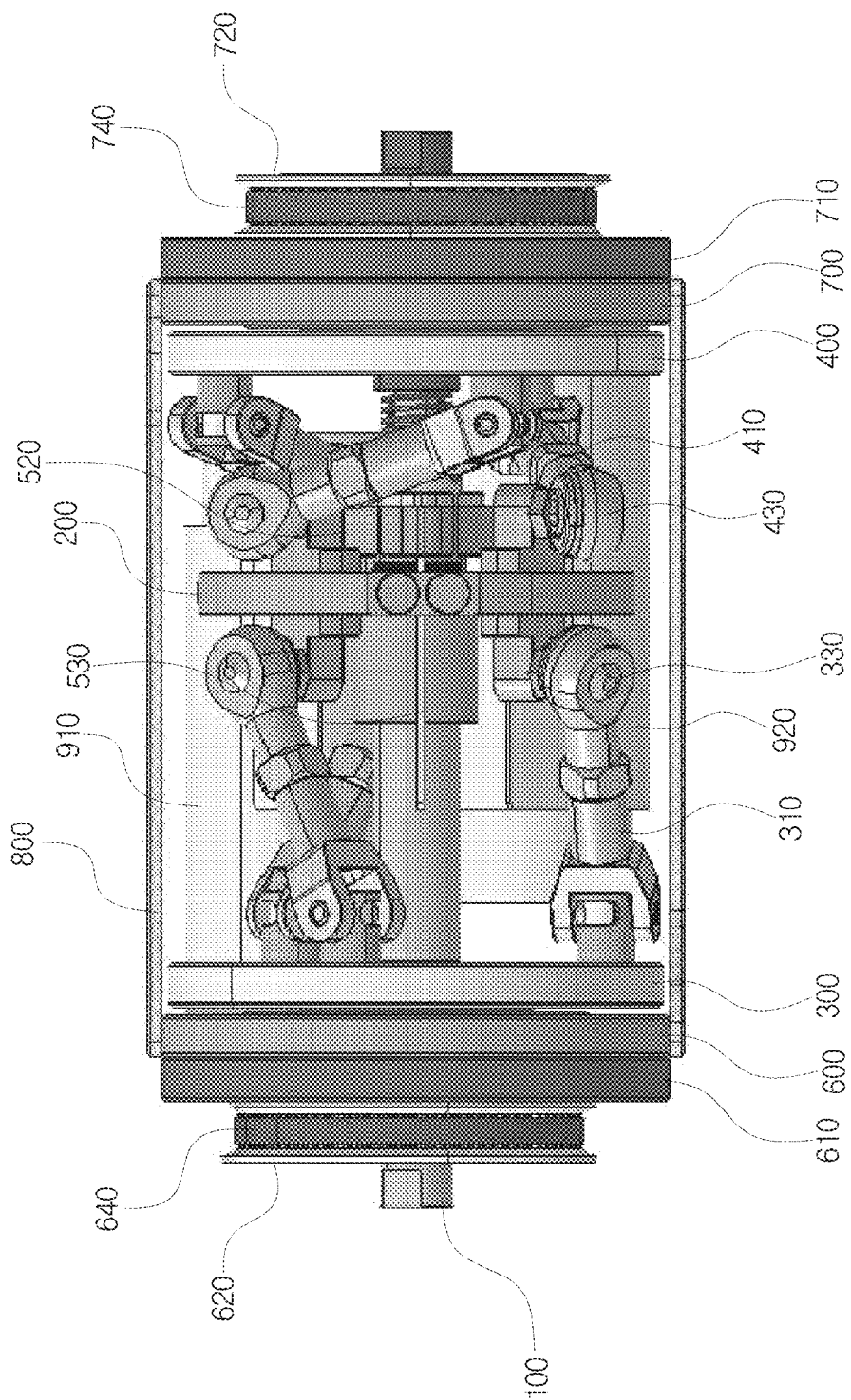

FIGS. 8 to 10 are diagrams for illustrating a stiffness adjusting operation by using the stiff regulating device 10 according to this embodiment.

In a state shown in FIG. 8, the first driving motor 910 and the second driving motor 920 are respectively driven with the same power so that the first rotating body 300 and the second rotating body 400 rotate together in the counterclockwise direction (based on the state shown in FIG. 1). Since the first rotating body 300 and the second rotating body 400 face each other, the first rotating body 300 and the second rotating body 400 rotate in opposite directions based on the rotary shaft 100.

According to the above operation, as shown in FIG. 9, the rotational connection body 200 moves toward the first rotating body 300 by the mechanical operation of the link arms 310, 410.

Contrarily, as shown in FIG. 10, in order to move the rotational connection body 200 toward the second rotating body 400, the first driving motor 910 and the second driving motor 920 are respectively driven with the same power so that the first rotating body 300 and the second rotating body 400 rotate together in the clockwise direction (based on the state shown in FIG. 1). At this time, since the first rotating body 300 and the second rotating body 400 face each other, the first rotating body 300 and the second rotating body 400 also rotate in opposite directions based on the rotary shaft 100.

According to the operations shown in FIGS. 8 to 10, the driving power of the first driving motor 910 and the second driving motor 920 is not transmitted to the rotary shaft 100, and only the first rotating body 300 and the second rotating body 400 are used to freely rotate on the rotary shaft 100.

In addition, since the first driving motor 910 and the second driving motor 920 move the first rotating body 300 and the second rotating body 400 with the same power, the rotational connection body 200 linked to the first rotating body 300 and the second rotating body 400 does not rotate with respect to the rotary shaft 100 but just moves in the length direction. Therefore, force is not applied to the leaf spring 530 by the rotational connection body 200.

Figure 11:
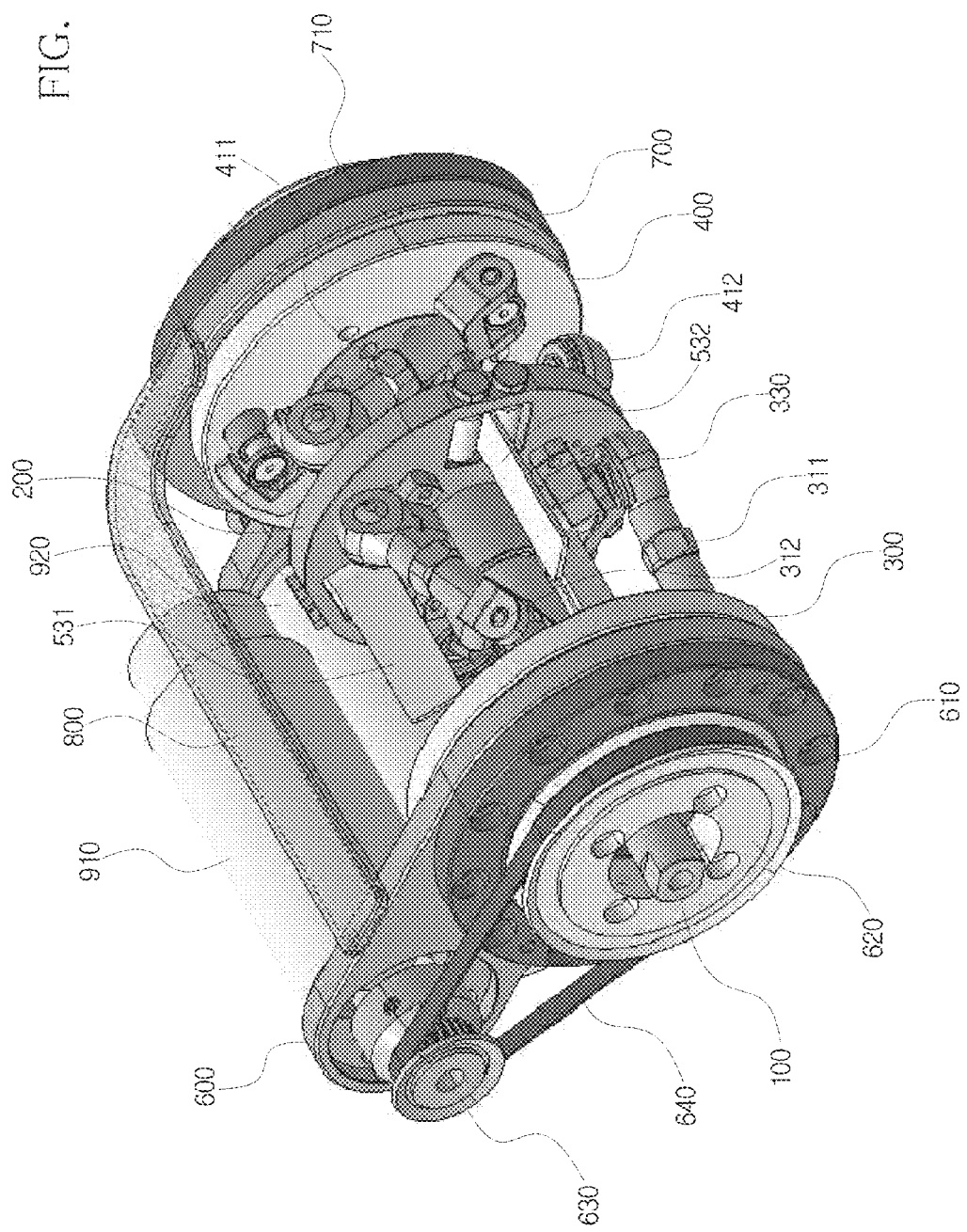
FIGS. 11 and 12 are diagrams for illustrating an operation of rotating the rotary shaft by using the device for regulating stiffness of FIG. 2.
Figure 12:
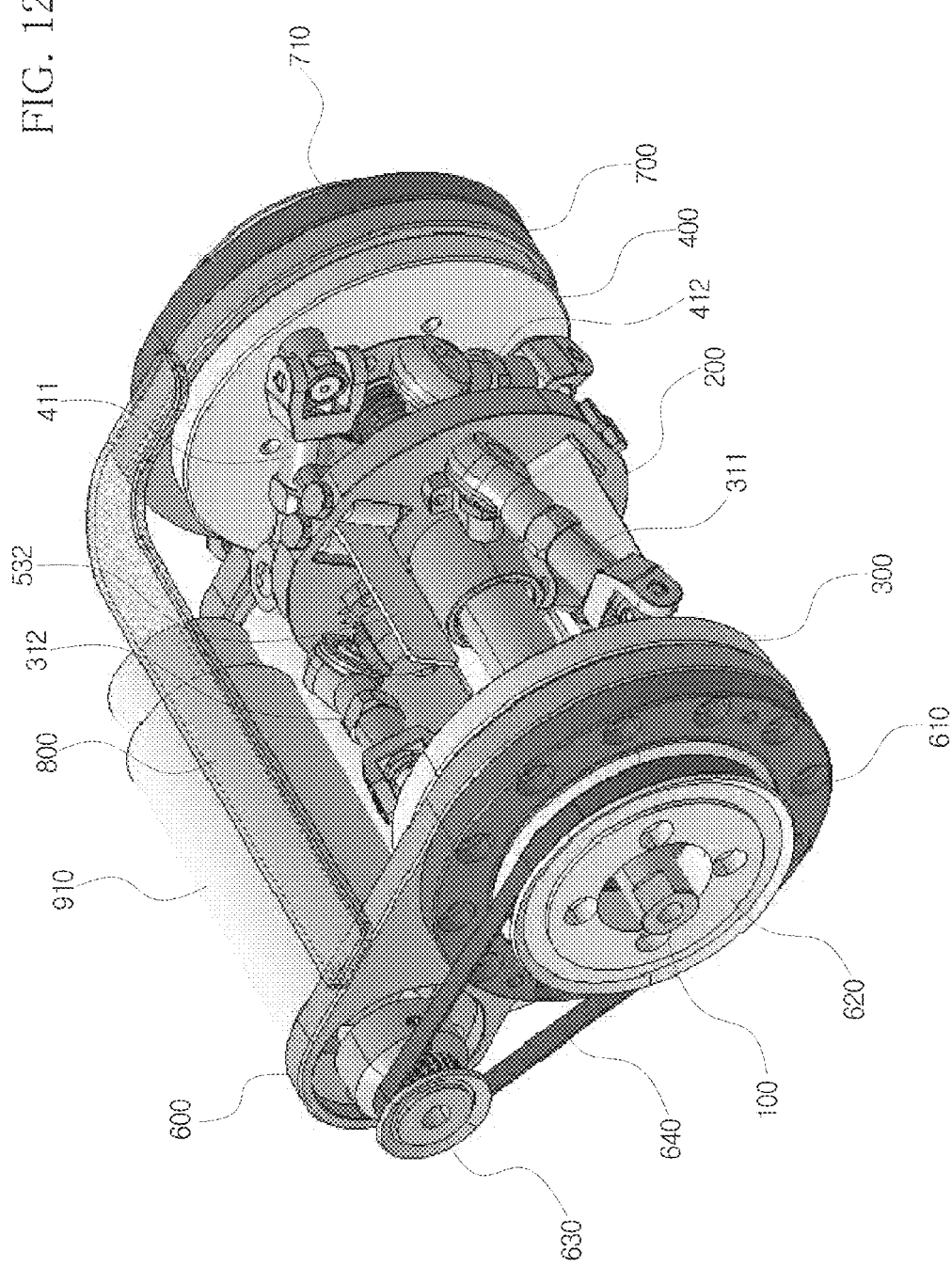

FIGS. 11 and 12 are diagrams for illustrating an operation of rotating the rotary shaft 100 by using stiff regulating device 10 according to this embodiment.

In a state shown in FIG. 11, the first driving motor 910 and the second driving motor 920 are respectively driven with the same power so that their driving directions are opposite to each other, and therefore the first rotating body 300 rotates in the clockwise direction and the second rotating body 400 rotates in the counterclockwise direction (based on the state shown in FIG. 11). Since the first rotating body 300 and the second rotating body 400 face each other, the first rotating body 300 and the second rotating body 400 rotate in the same direction based on the rotary shaft 100.

Since the first rotating body 300 and the second rotating body 400 rotate in the same direction, the rotational connection body 200 linked to the first rotating body 300 and the second rotating body 400 starts freely rotating with respect to the rotary shaft 100 together with the rotating bodies 300, 400. Since the first rotating body 300 and the second rotating body 400 rotate at the same speed, the rotational connection body 200 does not move in the length direction of the rotary shaft 100.

Since the rotating path of the rotational connection body 200 is restricted by the leaf spring 530 of the elastic connection body 500, the elastic connection body 500 rotates by the rotating force of the rotational connection body 200, and accordingly the rotary shaft 100 fixed to the elastic connection body 500 rotates, which makes the driven member rotate.

In FIGS. 11 and 12, in order to show that the rotational connection body 200 is rotating, the link arms 310, 410 are depicted distinguishably with reference symbols 311, 312, 411, 412.

If the driving motor is driven reverse to the above so that the first rotating body 300 rotates in the counterclockwise direction and the second rotating body 400 rotates in the clockwise direction, it will be understood that the rotational connection body 200 may rotate opposite to FIGS. 11 and 12 and the rotary shaft 100 may rotate in a reverse direction.

Figure 13:
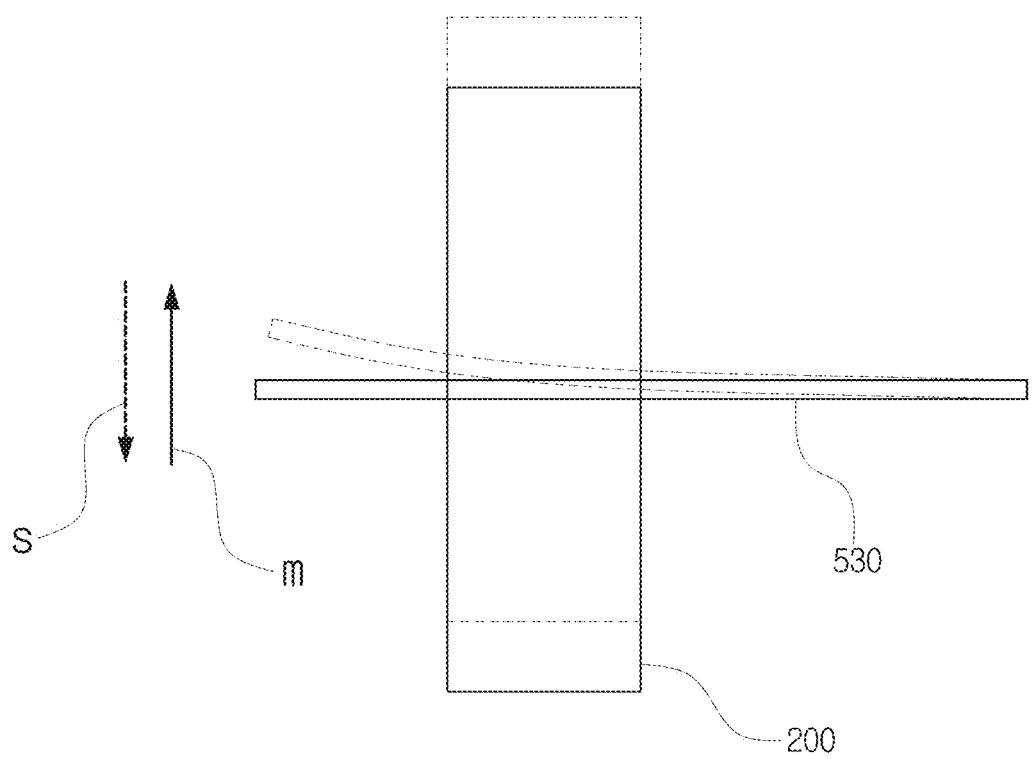
FIG. 13 is a diagram for illustrating a principle of generating stiffness by using the elastic connection body, in the device for regulating stiffness of FIG. 2.

As shown in FIG. 13, according to this embodiment, since the end of the leaf spring 530 of the elastic connection body 500 toward the first rotating body 300 is a free end, if the rotational connection body 200 applies force in the rotating direction M, the leaf spring 530 is bent. The bent leaf spring 530 has an elastic force to restore its original form, and the elastic force pushes the rotational connection body 200 in a direction S opposite to the rotating direction of the rotational connection body 200 so as to serve as stiffness when the driving power of the driving motors 910, 920 is transmitted to the rotary shaft 100.

In more detail, at the instant that the rotational connection body 200 rotates by the driving motors 910, 920, the leaf spring 530 is bent by the rotational connection body 200, and the rotational driving power of the driving motors 910, 920 is not directly transmitted to the rotary shaft 100. In other words, even though the driving motors 910, 920 rotate, the rotary shaft 100 does not rotate instantly but rotates with a time difference during which the leaf spring 530 is being bent.

According to the above configuration, the problem caused by perfect stiffness coupling between the driving motor and the rotary shaft may be solved.

Further, according to this embodiment, as shown in FIGS. 8 to 10, the magnitude of stiffness may also be adjusted by controlling the location of the rotational connection body 200.

Figure 14:
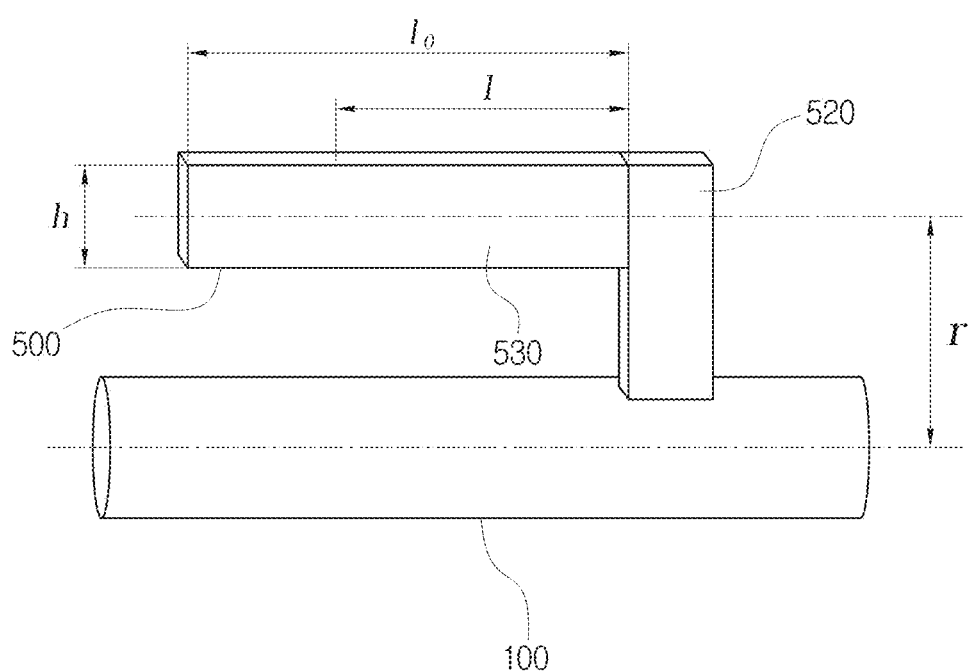
FIG. 14 is a diagram for illustrating that stiffness may be adjusted by using the device for regulating stiffness of FIG. 2.

FIG. 14 is a diagram for illustrating that stiffness may be adjusted by using the stiff regulating device 10 according to this embodiment.

As shown in FIG. 14, assuming that the distance from the support body 520 to a location where the rotational connection body 200 is positioned is I, the thickness of the leaf spring 530 is h, and the distance between the center of the rotary shaft 100 and the thickness center of the leaf spring 530 is r, the stiffness σ provided by the leaf spring 530 may be expressed according to Equation 1 below.

$$\sigma = \frac{Eht^3}{4l^3} r^2 \qquad \text{Equation 1}$$

where E is a Young's modulus of the leaf spring.

If the rotational connection body 200 moves toward the support body 520, the distance I is decreased, which makes the stiffness σ increase. As shown in FIG. 10, if the rotational connection body 200 adheres to the support body 520 as close as possible, the driving power of the driving motors 910, 920 is transmitted to the rotary shaft 100 as if it is perfect stiffness coupling. However, as shown in FIG. 9, if the rotational connection body 200 is located farthest from the support body 520, the stiffness σ is minimized, and so the time difference increases as much when the driving power of the driving motors 910, 920 is transmitted to the rotary shaft 100.

Heretofore, it has been described that stiffness is adjusted by using the stiff regulating device 10 and the rotating force of the driving motor is transmitted to the rotary shaft 100 by using the adjusted stiffness.

Hereinafter, a configuration for preventing the stiff regulating device 10 from being broken or preventing an obstacle contacting a driven member from being broken when an external force is applied to the rotating driven member by the obstacle will be described.

A driven member (not shown) rotating by the rotary shaft 100 may contact an obstacle so that its rotation is interrupted. This case may correspond to a conventional example, described above, where the calf of a patient is interrupted by an obstacle or a joint portion is hardened and immovable when the stiff regulating device 10 is used for a link structure for rehabilitation training.

Referring to FIG. 11 again, if an external force is applied to the driven member due to a circumstance as described above, the rotation of the rotary shaft 100 is interrupted. At this time, the driving motors 910, 920 keep rotating the rotational connection body 200 regardless of the above situation. Therefore, a very large force is instantly applied to the elastic connection body 500 by the rotational connection body 200, in comparison to ordinary time.

According to this embodiment, it is prevented that the driving power of the driving motor is continuously transmitted to the rotary shaft 100, by using the fixing member described above.

Figure 15:
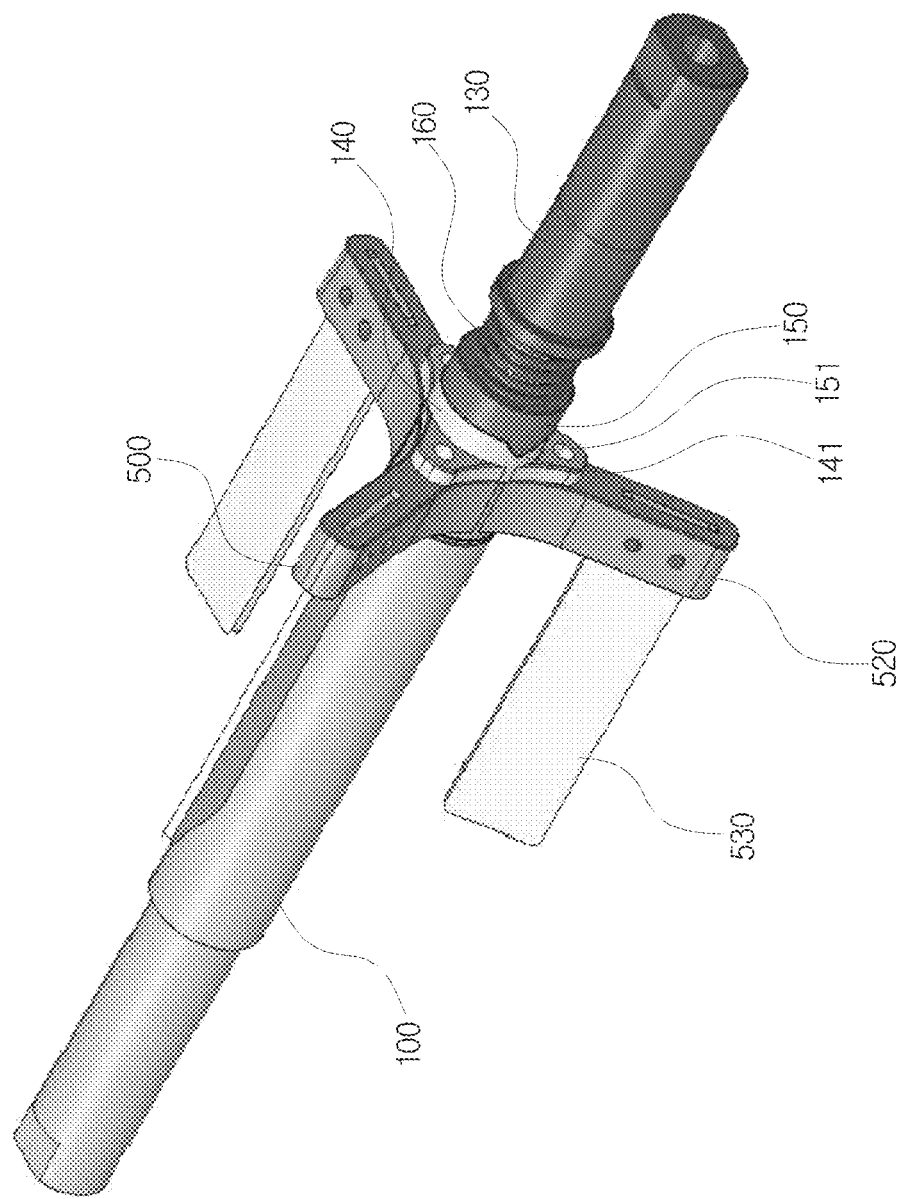
FIGS. 15 to 17 are diagrams for illustrating that the transmission of a driving power of the driving motor to the rotary shaft is intercepted, in the device for regulating stiffness of FIG. 2.
Figure 16:
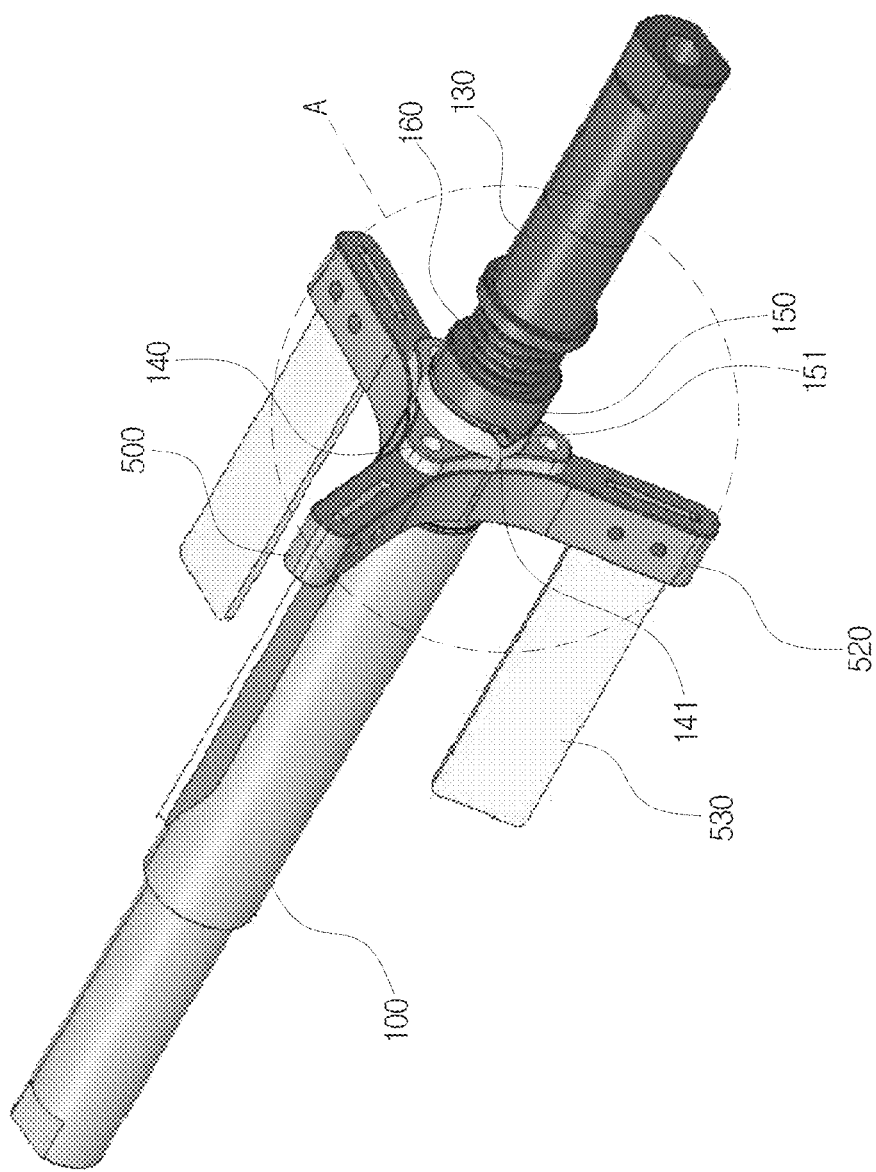
Figure 17:
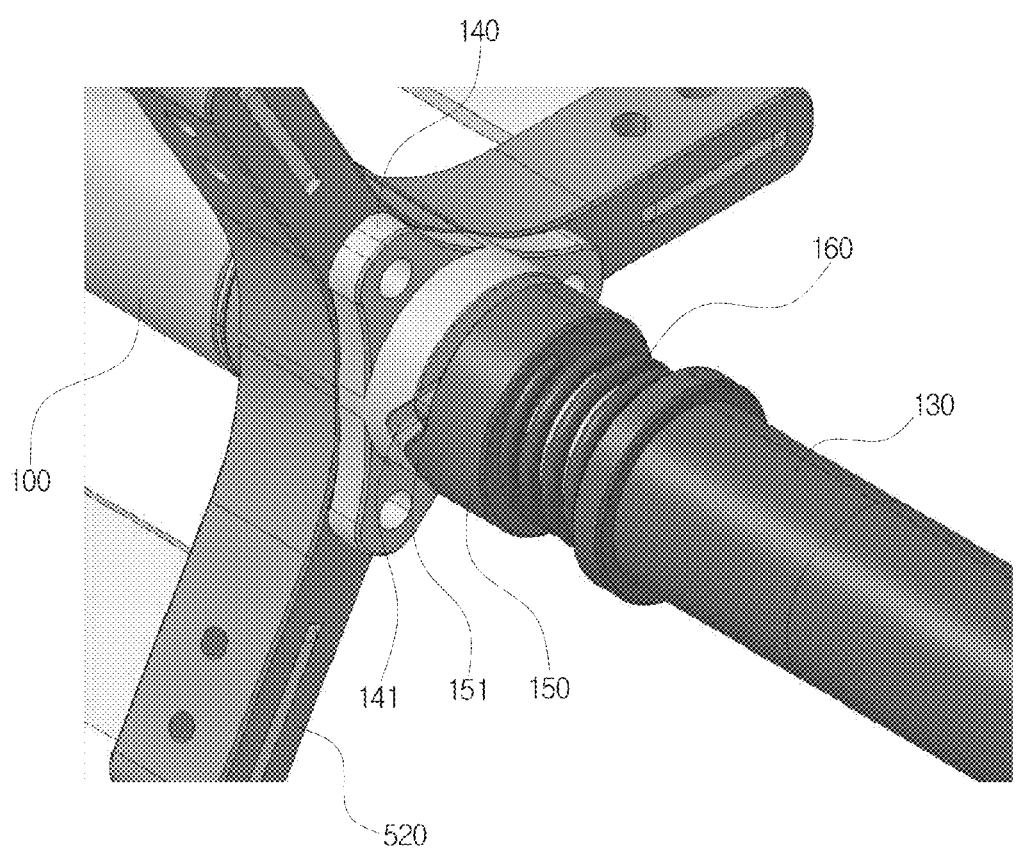

FIGS. 15 to 17 are diagrams for illustrating that the transmission of a driving power of the driving motor to the rotary shaft 100 is intercepted by using the fixing member.

FIGS. 15 and 16 shows the rotary shaft 100 and the elastic connection body 500 of the stiff regulating device 10, and FIG. 17 is an enlarged view showing the A portion of FIG. 16.

As described above, the elastic connection body 500 is coupled to the rotary shaft 100 to freely rotate thereon. However, at ordinary time, the free rotation of the elastic connection body 500 is prevented since the coupling protrusion 151 of the second cam member 150 not freely rotatable but fixed with respect to the rotary shaft 100 is coupled to the coupling groove 141 of the first cam member 140 which is coupled to the rear surface of the support body 520 of the elastic connection body 500.

In more detail, as shown in FIG. 15, in a state where the coupling groove 141 and the coupling protrusion 151 are coupled to each other, the spring 160 does not rotate with respect to the rotary shaft 100 but strongly presses the second cam member 150 toward the first cam member 140 so that the elastic connection body 500 is fixed to the rotary shaft 100.

However, as shown in FIGS. 16 and 17, if the elastic connection body 500 keeps rotating (namely, if the rotational connection body 200 keeps rotating by the driving motor) in a state where an external force is applied to the rotary shaft 100 and interrupts the rotation of the rotary shaft 100, the coupling protrusion 151 with a slant deviates from the coupling groove 141 along the inclined surface of the coupling groove 141.

Figure 18:
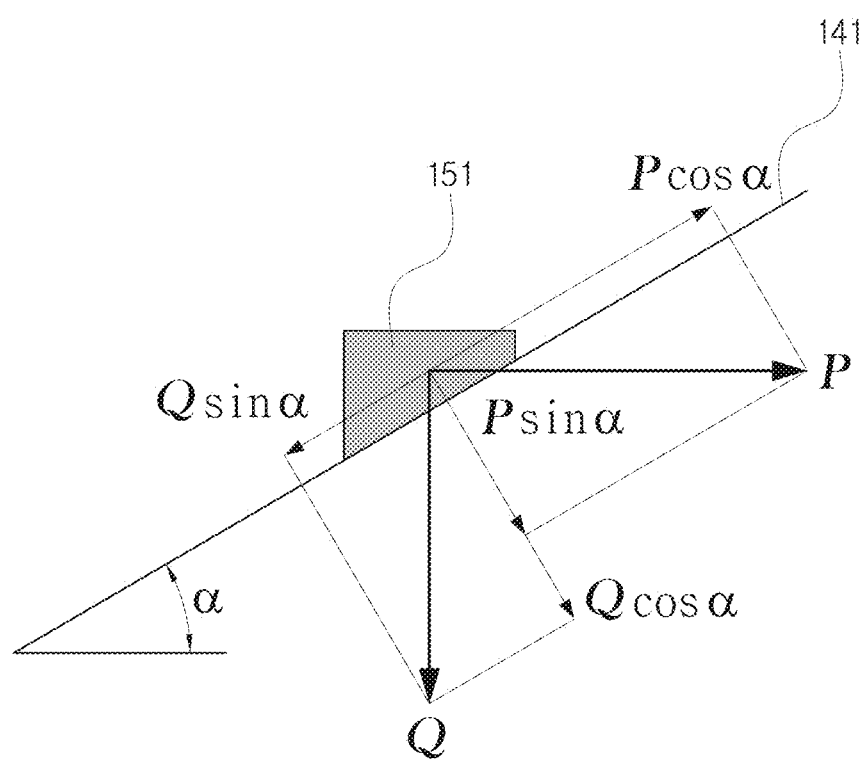
FIG. 18 is a diagram for illustrating a yield force by which a coupling protrusion deviates from a coupling groove, in the device for regulating stiffness of FIG. 2.

FIG. 18 is a diagram for illustrating a maximum yield force by which the coupling protrusion 151 deviates from the coupling groove 141.

In FIG. 18, the coupling protrusion 151 is depicted just by half and the coupling groove 141 is exaggeratingly depicted, for convenience.

Referring to FIG. 18, the yield force P by which the coupling protrusion 151 deviates from the coupling groove 141 is expressed like Equation 2 below.

$$P = \frac{Q(\mu + \tan\alpha)}{1 - \mu\tan\alpha} \qquad \text{Equation 2}$$

where Q represents a force of the spring 160, α represents an inclined pressure angle of the coupling protrusion 151, and μ represents a frictional coefficient between the coupling protrusion 151 and the coupling groove 141.

Therefore, in a state where the rotation of the rotary shaft 100 is interrupted, if the rotating force of the rotational connection body 200 by the driving motor increases over the yield force P, the coupling protrusion 151 deviates from the coupling groove 141.

If the coupling protrusion 151 deviates from the coupling groove 141, the force restricting the free rotation of the elastic connection body 500 with respect to the rotary shaft 100 disappears. Therefore, the elastic connection body 500 freely rotates with respect to the rotary shaft 100, and the driving power of the driving motors 910, 920 is not transmitted to the rotary shaft 100.

In this way, it is possible to prevent the stiff regulating device 10 from being broken or an obstacle interrupting rotation of the rotary shaft 100 from being broken since the driving power of the driving motor is continuously transmitted in a state where the rotation of the rotary shaft 100 is interrupted.

While the exemplary embodiments have been shown and described, it will be understood by those skilled in the art that various changes in form and details may be made thereto without departing from the spirit and scope of the present disclosure as defined by the appended claims.

What is claimed is:

1. A device for regulating stiffness for transmitting a driving power of a driving motor to a driven member while maintaining predetermined stiffness, the device comprising:
   a rotary shaft coupled to the driven member to rotate the driven member;
   a rotational connection body coupled to the rotary shaft to freely rotate thereon and rotating by a driving power of the driving motor; and
   an elastic connection body fixed to the rotary shaft and extending in the length direction of the rotary shaft to connect to the rotational connection body, the elastic connection body comprising
   a leaf spring, and
   a support body fixed to the rotary shaft and fixing the leaf spring in the length direction of the rotary shaft,
   wherein the elastic connection body gives an elastic force in a direction opposite to the rotating direction of the rotational connection body to interrupt free rotation of the rotational connection body with respect to the rotary shaft, the elastic force being generated as the leaf spring is bent in the rotating direction of the rotational connection body by using the support body as a support point,
   wherein if the rotational connection body rotates by the driving motor, the elastic force of the elastic connection body acts as a spring so that the rotating force of the rotational connection body is transmitted to the rotary shaft,
   wherein the rotational connection body is connected to the rotary shaft and the elastic connection body to be linearly movable in the length direction of the rotary shaft, and
   wherein the stiffness is adjusted by a linear movement of the rotational connection body in the length direction of the rotary shaft.

2. The device for regulating stiffness according to claim 1, wherein the rotational connection body is connected to the rotary shaft and the leaf spring to be linearly movable in the length direction of the rotary shaft, and
   wherein the stiffness is adjusted as the rotational connection body makes the linear movement so that a distance between the rotational connection body and the support body changes.

3. The device for regulating stiffness according to claim 2, further comprising a rotating body fixed to the rotary shaft to freely rotate thereon,
   wherein the rotating body is connected to the rotational connection body by a link, and as the rotating body rotates, the rotational connection body linearly moves in the length direction of the rotary shaft.

4. The device for regulating stiffness according to claim 3, wherein the link has one end joint-connected to the rotating body and the other end joint-connected to the rotational connection body and is formed by a link arm disposed with a slant with respect to the rotary shaft.

5. The device for regulating stiffness according to claim 4, wherein the link arm has one end connected to a universal joint connected to the rotating body and the other end connected to the rotational connection body by a ball joint.

6. The device for regulating stiffness according to claim 4, wherein a plurality of link arms are disposed radially based on the rotary shaft.

7. The device for regulating stiffness according to claim 3, wherein the rotating body includes a first rotating body and a second rotating body disposed with the rotational connection body being interposed therebetween,
   wherein the driving motor includes a first driving motor and a second driving motor respectively connected to the first rotating body and the second rotating body to rotate the first rotating body and the second rotating body independently,
   wherein the first rotating body and the second rotating body are respectively connected to the rotational connection body by the link,
   wherein, when the first driving motor and the second driving motor respectively rotate the first rotating body and the second rotating body in opposite directions based on the rotary shaft, the rotational connection body does not rotate with respect to the rotary shaft but linearly moves in the length direction of the rotary shaft, and
   wherein, when the first driving motor and the second driving motor respectively rotate the first rotating body and the second rotating body in the same direction based on the rotary shaft, the rotational connection body does not linearly move in the length direction of the rotary shaft but rotates with respect to the rotary shaft.

8. The device for regulating stiffness according to claim 1, wherein the support body is coupled to the rotary shaft to freely rotate thereon, and
   wherein the support body is selectively fixed to or separated from the rotary shaft by means of a fixing member so as to rotate integrally with the rotary shaft or freely rotate separately from the rotating body.

9. The device for regulating stiffness according to claim 8, wherein the fixing member includes:
   a first cam member coupled to the support body and having a coupling groove formed therein so as to be coupled with a coupling protrusion;
   a second cam member linearly movable on the rotary shaft and having the coupling protrusion formed thereon; and
   a spring connected to the second cam member to press the second cam member toward the first cam member.

10. The device for regulating stiffness according to claim 9, wherein the first cam member is coupled to the support body in a direction opposite to the direction in which the leaf spring is fixed.

11. The device for regulating stiffness according to claim 1, wherein the support body includes a plurality of support units extending in a radial direction with respect to the rotary shaft, and
    wherein a leaf spring is fixed to each of the plurality of support units.

* * * * *